June 13, 1961     W. CZERWINSKI     2,988,308
VERTICAL PROPULSION OF AIRCRAFT

Filed Feb. 5, 1958     2 Sheets-Sheet 1

INVENTOR
W. CZERWINSKI
BY Maybee & Legris
ATTORNEYS

June 13, 1961 W. CZERWINSKI 2,988,308
VERTICAL PROPULSION OF AIRCRAFT
Filed Feb. 5, 1958 2 Sheets-Sheet 2

T = EFFECTIVE THRUST
$T_i$ = STATIC THRUST
H = HEIGHT OF NOZZLES ABOVE GROUND.

RING DIMENSIONS:
   A. DIA. 3' HEIGHT 12"
   B. DIA. 4' 6" HEIGHT 8"
   C. DIA. 6' HEIGHT 8"

INVENTOR
W. CZERWINSKI
BY Maybee & Legris
ATTORNEYS

United States Patent Office 2,988,308
Patented June 13, 1961

2,988,308
VERTICAL PROPULSION OF AIRCRAFT
Waclaw Czerwinski, Toronto, Ontario, Canada, assignor to Avro Aircraft Limited, Village of Malton, Ontario, Canada, a corporation of Canada
Filed Feb. 5, 1958, Ser. No. 713,374
3 Claims. (Cl. 244—114)

This invention relates to a method of propelling an aircraft generally vertically at take-off and landing. The invention also relates to a combination of an aircraft having means to direct a propulsive gas stream vertically downwardly, with an installation for augmenting the effective thrust of the propulsive gas stream at take-off and landing.

There has been, in the last few years, a great deal of thought and work devoted to the construction and development of aircraft capable of taking-off and landing vertically. Several types of aircraft have been tested, including the type which is of substantially conventional configuration but which is capable, either by rotation of an engine or by jet deflection, to direct a propulsive thrust vertically downwardly. Another type of aircraft commonly known as the "tail sitter," is somewhat less conventional in configuration but differs mainly in the orientation of the aircraft at landing and take-off, the aircraft being disposed so that its longitudinal axis is vertical. The thrust from a gas turbine engine or from an engine-driven propeller is directed along the aircraft's longitudinal axis so that the aircraft takes off and lands vertically with a transition to the horizontal position for forward flight.

A difficult problem associated with either of these types of vertical take-off aircraft is the high thrust that must be provided for take-off and safe landing. Without investigation it would appear that it would be necessary merely to provide a thrust which is only slightly greater than the weight of the aircraft. This, however, is not the case, since close to the ground and well within the influence of "ground effect," the ratio of "effective thrust" to "static engine thrust" actually becomes less than unity. It has been, therefore, necessary to provide an engine or engines, the propulsive thrust of which is considerably in excess of the weight of the aircraft, in order for the aircraft to be able to take-off and land vertically.

It is an object of the invention to provide a method of propelling an aircraft generally vertically at landing and take-off.

It is another object of the invention to provide a device which, when associated with an aircraft capable of producing a downwardly directed propulsive thrust, will increase the effective propulsive thrust by a substantial amount when the aircraft is close to the ground.

The details of construction of embodiments of the invention will be apparent from a study of the following description read in conjunction with the accompanying drawings in which.

Figure 1:
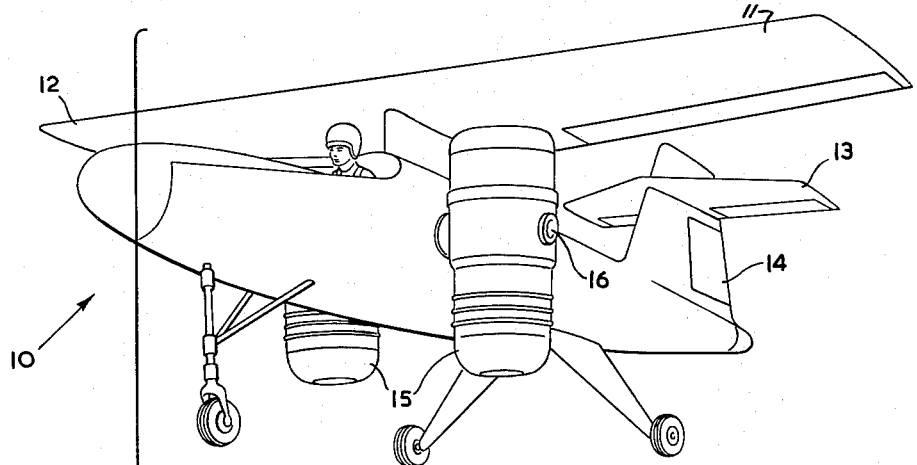
FIGURE 1 is a perspective view of a vertical take-off aircraft employing a pair of augmenter rings as an aid in take-off.

An aircraft, generally indicated at 10 in FIGURE 1, is provided with port and starboard wings 11 and 12 and horizontal and vertical tail surfaces 13 and 14 respectively. On either side of the aircraft and directly below each wing, gas turbine engines 15 are rotatably mounted on pivots 16 so that the thrust from the engines can be controlled in direction through 90° from vertically downwardly to horizontally aft.

Beneath each of the engines 15, and situated on the surface of the ground, are placed augmenter rings 17. Each ring 17 is in the form of a cylinder which has a low length to diameter ratio and provides an open topped enclosure with a substantially horizontal bottom surface and substantially vertical side walls. For use with the aircraft shown, whose engines each have a thrust of the order of 1,000 lbs. and an exit nozzle diameter of eleven inches, each ring is approximately six feet in diameter by eight inches high. In order to fasten the rings 17 to the ground, eight equiangularly spaced lugs 18 are fast to the outer wall of the ring and are provided with holes which are adapted to receive anchoring pins 19.

In operation, the rings 17 are anchored by the pins 19 directly beneath positions occupied by the engines 15 when the aircraft is on the ground, the centres of the rings being spaced apart by a distance equal to the distance between the centre lines of the engines 15. The gas streams from the engines 15 impinge on the substantially horizontal surfaces within the open topped enclosures formed by the rings 17 and the impinging gas stream is confined into vertical columnar form by the vertical walls of the rings. The confinement of the propulsive gas streams into vertical columnar form increases the pressure on the undersurfaces of the wings thus augmenting the propulsive thrust of the engines.

Figure 5:
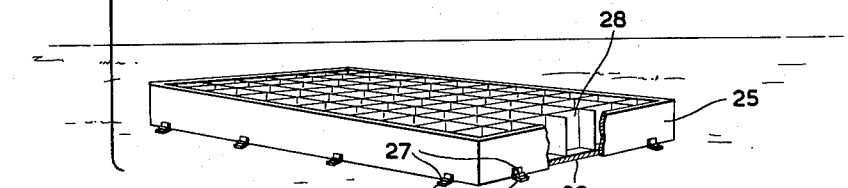
FIGURE 5 is a graph showing thrust augmentation plotted against engine nozzle height from the ground for three augmenter rings of different dimensions.
Figure 5:
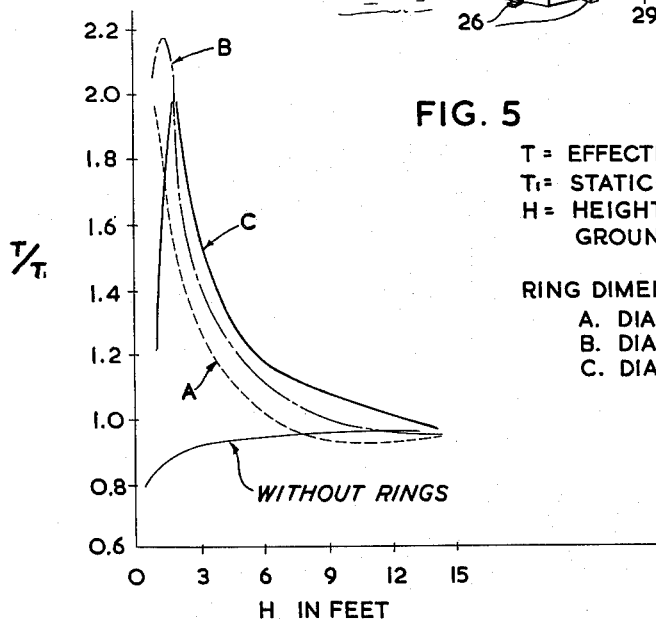

Tests have shown that using augmenter rings of this type and a vertical take-off aircraft of the type shown in the drawing, there is augmentation of the static engine thrust of the order of approximately 100% to provide an effective thrust of 200% of the static engine thrust. Reference to FIGURE 5 will show that when not using augmenter rings the ratio of the effective thrust to the static thrust increases from approximately 0.8 when the nozzles are about one foot from the ground to approximately unity when the nozzles are fifteen feet above the ground. The three curves A, B and C show the thrust augmentation for different dimensions of ring. The curve A shows the thrust augmentation due to a ring having a diameter of three feet and whose vertical walls have a height of twelve inches. It will be seen that when the nozzles are approximately one foot above the ground the ratio of the effective thrust to the static thrust is approximately 2 which is an augmentation of 100%.

Referring to curve B, it will be seen that the ratio of effective thrust to static thrust when using a ring of four feet six inches diameter and whose vertical walls are eight inches high rises steeply from a point where the nozzles are approximately one foot above the ground to a peak when the nozzles are approximately two feet above the ground. At this peak the ratio of the effective thrust to the static thrust is approximately 2.2 and the augmentation is in the neighbourhood of 120%.

Referring to curve C, this shows the thrust augmentation when using a ring whose diameter is six feet and the height of whose vertical walls is eight inches. Two such rings are shown under an aircraft in FIGURE 1. The peak of the ratio of the effective thrust to the static thrust rises to nearly 2, an augmentation of some 100%, when the nozzles are approximately two feet above the ground. All the curves A, B and C decrease in height smoothly as the height of the nozzles above the ground increases until they approximate to the unaugmented curve when the nozzles are some fifteen feet above the ground.

The increase in effective thrust obtained by the use of the rings is unexpectedly great and the advantages gained therefrom are readily apparent, especially when it is considered that without using augmenter rings the effective thrust of the engine or engines at take-off is less than 100% of the static engine thrust.

From study of the graphs of FIGURE 5 it will be seen that the maximum thrust augmentation varies with the dimensions of the ring, the thrust augmentation being greatest when the ring is 4′6″ in diameter and 8″ in height. When used with aircraft having downwardly directed propulsive nozzles the rings preferably have a greater diameter than the nozzles but the optimum size of the ring will be found by empirical methods.

Figure 2:
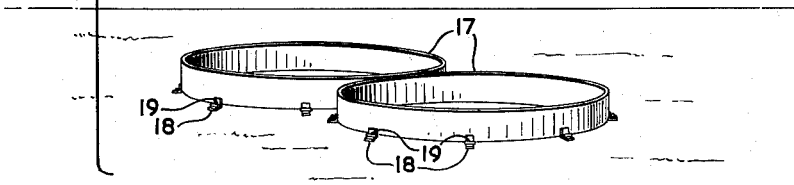
FIGURE 2 is a perspective view showing one of the augmenter rings.
Figure 3:
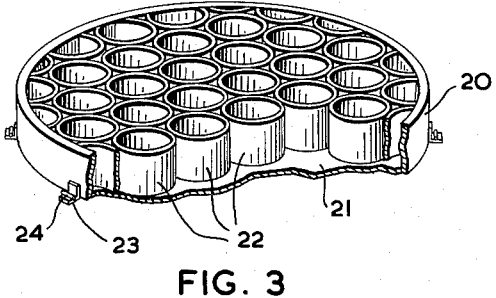
FIGURE 3 is a perspective view, partly broken away, of another embodiment of augmenter ring.

Referring now to FIGURE 3, there is shown another embodiment of augmenter ring in which the inside of the enclosure is constituted by a multi-cellular structure. The ring has vertical side walls 20, a base plate 21 and a multiplicity of contiguous cylinders 22 resting on the base plate 21 and within the vertical walls 20. Conveniently the cylinders 22 are about 12″ in diameter, i.e. slightly larger than the nozzles. The ring is fastened to the ground by lugs 23 and anchor pins 24 in a manner similar to that shown for the ring 17 in FIGURES 1 and 2. This multi-cellular structure has the effect of confining the propulsive gases impinging upon the base plate 21 of the enclosure into vertical columnar form and augmenting the effective thrust in the same manner as described for the previous embodiment of the invention.

Figure 4:
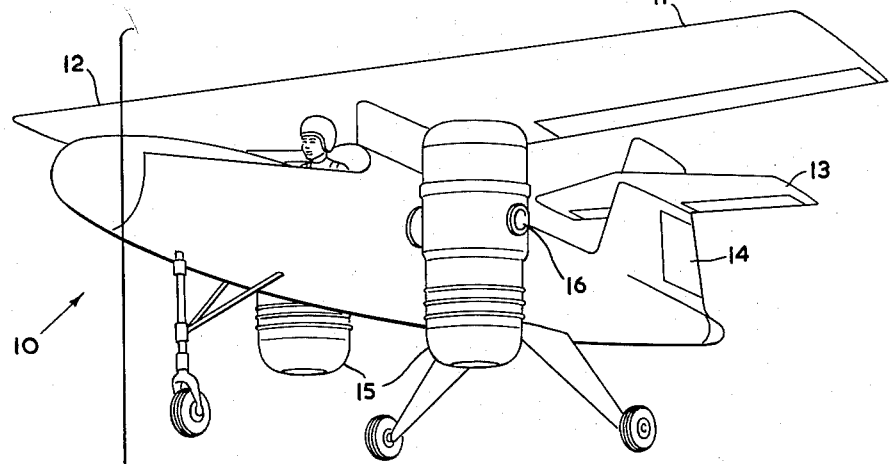
FIGURE 4 is a perspective view similar to FIGURE 1 but showing a different form of augmenting device.

Referring now to FIGURE 4, there is shown a unitary enclosure somewhat similar to that shown in FIGURE 3 except that the vertical side walls 25 of the enclosure are in the form of a rectangle and the enclosure is subdivided into a multiplicity of square cells. The enclosure is secured to the ground by lugs 26 and anchoring pins 27 in the same manner as the enclosures already described. The interior of the enclosure is subdivided by a grid 28 of vertical walls resting on a base plate 29 to provide a multi-cellular structure in a somewhat similar manner to that described with reference to FIGURE 3. For use with the aircraft shown, the square cells may be approximately 12″ square, i.e. slightly larger than the discharge area of one of the propulsive nozzles of the aircraft.

The enclosure may be positioned under both engines, thus dispensing with the need for a separate ring for each engine, and the propulsive gases will be confined into vertical columnar form in the same manner as in the other embodiments.

Although the enclosure in FIGURE 4 is shown as being secured to the ground, it could be made self-supporting and large enough for the aircraft to be able to land and take off, using the top of the multi-cellular structure as a landing platform. Such a platform would find use mounted outboard on an aircraft carrier and would consist of a substantially horizontal base platform upon which would be provided a plurality of contiguous open topped enclosures as shown in FIGURE 3 or FIGURE 4, the tops of the dividing walls between the cells providing the landing surface proper.

The thrust augmentation obtained by use of the invention will vary with the dimensions of the enclosures used as well as with the height of the propulsive nozzle above the enclosure and the diameter of the jet of a propulsive nozzle. Generally, however, it is preferred that the enclosures have cross-sections at least as great as that of the nozzle. Moreover, although the invention has been described with reference to aircraft having gas turbine engines delivering propulsive gas streams it may also be used with helicopters and aircraft having airscrews and means to duct the propulsive gas stream induced by the airscrews vertically downwardly. Furthermore, although gains of up to 100% in the effective thrust may be obtained with aircraft of the type shown in the drawings, such large gains in thrust will not be obtained when used with aircraft of the "tail sitter" type, there is, however, a sufficient area presented to the confined propulsive gas stream to give a thrust augmentation so that the ratio of the effective thrust to the static thrust at take-off will be greater than unity.

With any particular aircraft, the constants of the aircraft such as the diameter of the jet nozzle and the height of the jet nozzle above the ground or the diameter of the airscrew will be known quantities and it is a simple matter by empirical tests to obtain the optimum values of ring diameter and height. It will be seen from the graphs of FIGURE 5 that the thrust augmentation decreases as the propulsive nozzles of the engines move away from the ground. It may be noted that the thrust augmentation is greatest at a point where the ratio of effective thrust to static thrust is least when not using an augmenter. This is an important characteristic of the invention since augmentation at this point tends to "cushion" an aircraft carrying out a vertical landing.

When using the invention with a helicopter it has been found convenient to dimension the enclosure so that it approximates in diameter to the diameter of the helicopter rotor. Similarly, in using the invention with a "tail sitter" aircraft the enclosure may have a diameter approximately equal to the diameter of the airscrew.

It will be understood that the form of the invention herewith shown and described is a preferred example and various modifications can be carried out without departing from the spirit of the invention or the scope of the appended claims.

What I claim as my invention is:

1. The combination of an aircraft having means to direct a propulsive gas stream vertically downwardly at take-off and landing and a support platform to receive the aircraft, said platform having an imperforate, substantially horizontal surface on which the gas stream impinges and a plurality of vertical walls in the form of contiguous vertical cylinders extending upwardly from said surface and forming open topped cells to confine the impinging gas stream into vertical columnar form.

2. The combination of an aircraft having a plurality of engines to direct a plurality of propulsive gas streams vertically downwardly at take-off and landing and a support platform to receive the aircraft, said platform having a plurality of open topped enclosures to receive the gas streams, each enclosure having an imperforate, substantially horizontal bottom surface on which the gas stream impinges and substantially vertical wall means extending upwardly from said surface to confine the impinging gas stream into vertical columnar form, the centres of the enclosures being spaced apart by distances equal to the distances between the centre lines of the aircraft engines.

3. The combination of an aircraft having a plurality of engines to direct a plurality of propulsive gas streams vertically downwardly at take-off and landing and a support platform to receive the aircraft, said platform having a plurality of open topped enclosures to receive the gas streams, each enclosure having an imperforate, substantially horizontal bottom surface on which the gas stream impinges and a plurality of vertical walls in the form of contiguous vertical cylinders extending upwardly from said surface to provide a plurality of open topped cells to confine the impinging gas stream into vertical columnar form, the centres of the enclosures being spaced apart by distances equal to the distances between the centre lines of the aircraft engines.

References Cited in the file of this patent

UNITED STATES PATENTS

| | | |
|---|---|---|
| 1,709,058 | Brunner | Apr. 16, 1929 |
| 1,914,573 | Kookogey | June 20, 1933 |
| 2,750,133 | Lebold | June 12, 1956 |